(12) United States Patent
Marzano et al.

(10) Patent No.: US 8,727,078 B2
(45) Date of Patent: May 20, 2014

(54) SELECTIVELY INCREMENTALLY ACTUATED LINEAR EDDY CURRENT BRAKING SYSTEM

(75) Inventors: Domenic P. Marzano, New Castle, PA (US); Michael Gustason, Tehachapi, CA (US)

(73) Assignee: Velocity Magnetics, Inc., New Castle, PA (US)

( * ) Notice: Subject to any disclaimer, the term of this patent is extended or adjusted under 35 U.S.C. 154(b) by 0 days.

(21) Appl. No.: 11/058,880

(22) Filed: Feb. 16, 2005

(65) Prior Publication Data

US 2005/0263356 A1    Dec. 1, 2005

Related U.S. Application Data

(60) Provisional application No. 60/575,431, filed on May 28, 2004.

(51) Int. Cl.
*B60L 7/00* (2006.01)
*F16D 55/00* (2006.01)

(52) U.S. Cl.
USPC ............................ 188/164; 188/267; 188/73.1

(58) Field of Classification Search
USPC ........ 188/71.1, 72.1, 73.1, 73.31, 267, 267.2, 188/156–159, 164, 165; 310/12, 15, 17, 19, 310/22
See application file for complete search history.

(56) References Cited

U.S. PATENT DOCUMENTS

| | | | |
|---|---|---|---|
| 3,794,425 A * | 2/1974 | Smith et al. .................... 356/51 |
| 4,486,638 A | 12/1984 | de Bennetot | |
| 4,767,954 A | 8/1988 | Phillips | |
| 4,857,786 A * | 8/1989 | Nihei et al. .............. 310/156.38 |
| 5,479,145 A | 12/1995 | Kalsi | |
| 5,757,091 A | 5/1998 | Sogabe et al. | |
| 5,952,742 A | 9/1999 | Stoiber et al. | |
| 6,062,350 A | 5/2000 | Spieldiener et al. | |
| 6,253,887 B1 * | 7/2001 | Frank et al. ................... 188/197 |
| 6,293,376 B1 | 9/2001 | Pribonic ....................... 185/165 |
| 6,326,708 B1 | 12/2001 | Tsuboi et al. | |
| 6,361,268 B1 * | 3/2002 | Pelrine et al. .............. 414/749.2 |
| 6,412,611 B1 | 7/2002 | Pribonic ....................... 188/165 |
| 6,417,584 B1 | 7/2002 | Chitayat | |
| 6,523,650 B1 | 2/2003 | Pribonic et al. ............... 188/165 |
| 6,533,083 B1 | 3/2003 | Pribonic et al. ............... 188/165 |
| 6,633,217 B2 * | 10/2003 | Post ............................... 335/306 |
| 6,659,237 B1 | 12/2003 | Pribonic ....................... 188/165 |
| 6,703,754 B1 | 3/2004 | Finkenbinder et al. | |
| 6,918,469 B1 | 7/2005 | Pribonic et al. ............... 188/165 |
| 2001/0018641 A1 * | 8/2001 | Kodaka et al. ................ 701/301 |
| 2002/0003510 A1 * | 1/2002 | Shigetomi ....................... 345/31 |
| 2004/0233417 A1 * | 11/2004 | Takahama et al. .......... 356/28.5 |
| 2004/0262103 A1 * | 12/2004 | Rosner .......................... 188/164 |

FOREIGN PATENT DOCUMENTS

| | | |
|---|---|---|
| DE | 1259453 | 1/1968 |
| DE | 41 37 201 A1 | 5/1993 |
| DE | 19817233 | 1/2000 |

(Continued)

*Primary Examiner* — Melody Burch

(74) *Attorney, Agent, or Firm* — Patton Boggs LLP (57) ABSTRACT

The invention is an incrementally actuated eddy current braking system. The system comprises first and second primary members, which further comprise arrays of permanent magnets arranged in alternating polarity. The respective magnets of the arrays face one another. A means for incremental displacement is drivingly connected to at least one of the primary members enabling the movement of said members relative to one another.

21 Claims, 13 Drawing Sheets

(56) References Cited

FOREIGN PATENT DOCUMENTS

| | | |
|---|---|---|
| DE | 20119119 | 4/2003 |
| EP | 0 959 549 A1 | 5/1998 |
| GB | 433408 | 8/1935 |
| GB | 1456366 | 11/1976 |
| JP | 57151263 | 9/1982 |
| JP | 59172967 | 9/1984 |
| JP | 2002352539 A * | 12/2002 |
| WO | WO 02/07291 A1 | 1/2002 |

* cited by examiner

SELECTIVELY INCREMENTALLY ACTUATED LINEAR EDDY CURRENT BRAKING SYSTEM

CLAIM OF PRIORITY

This application claims priority of U.S. Provisional Application No. 60/575,431 filed on May 28, 2004.

FIELD OF THE INVENTION

This invention relates to a linear synchronous magnetic motor utilized primarily for braking. In particular, this invention relates to a linear synchronous magnetic motor utilized for braking that can be incrementally actuated to allow for the application of the variable braking force.

BACKGROUND OF THE INVENTION

It is known in the art to provide a linear synchronous magnetic motor as an electrodynamic brake. Such electrodynamic brakes are activated when the modules of the brake having permanent magnets of alternating polarity face one another, wherein each permanent magnet in each array faces and opposes a magnet of opposite polarity. The brakes can be deactivated by displacing one of the modules forward or backward 180 electrical degrees, which causes the magnetic field to diminish to a negligible level.

At present, such brakes are configured to be either fully in phase or out of phase, i.e., shifting the brakes 180 electrical degrees by fully displacing the module forward or backward or by lowering or raising a module away from the braking zone. It is also known to have such brakes configured to shift from one phase angle to another phase angle, e.g., from 180 electrical degrees to 90 electrical degrees, in order to provide an intermediate level of braking force. But no known system provides for the precise shifting of the modules to selected phase angles to provide the application of a number of selected braking forces.

Thus, there exists a need for an apparatus and method that provides for the incremental and precise application of braking force of an eddy current brake. For example, a brake configured to be shifted to any selected phase angle, rather than simply from one phase angle to another phase angle, would be most desirable. And there exists a need to do so with accurate metering, the type of which could not be achieved by a system that employed only double-acting piston cylinders.

It would be further desirable to link such a brake to a control system whereby a selected phase angle, which in turn translates to a selected braking force, could be selected on the basis of a selected condition such as velocity of the incoming vehicle and environmental factors. A system that determines the incoming velocity, for example, an object and applies a precise braking force based on that reading would be desirable. Such a system would allow for precise braking to occur in the event that the object or vehicle approaching the braking zone is not traveling at the designed or intended velocity due to external or unforeseen influences such as temperature, fluctuations in mass, or variable drag coefficients that are imposed on the moving vehicle. In most instances, achieving the desired incremental application of brake force is not possible due to the high difficulty of displacing the opposing modules forward and slightly downward brought on by mechanical interference that occurs surrounding the motor module, and due to the magnetic force between the modules which tends to push the opposing magnets in the module toward equilibrium.

SUMMARY AND OBJECT OF THE INVENTION

The invention is an incrementally actuated eddy current braking system. The system comprises first and second primary members, which further comprise arrays of permanent magnets arranged in alternating polarity. The respective magnets of the arrays face one another. A means for incremental displacement is drivingly connected to at least one of the primary members.

Thus, it is an object of the invention to provide an electrodynamic brake that can apply a selected brake force incrementally.

It is a further object of the invention to provide an electrodynamic brake that does not have simply two phases, but which can apply a plurality of selected braking forces.

It is still a further object of the invention to provide a system and method that provides a selected braking force based on a condition, for example, velocity or mass of an incoming vehicle, or temperature.

DESCRIPTION OF THE PRESENTLY PREFERRED EMBODIMENT OF THE INVENTION

Figure 3:
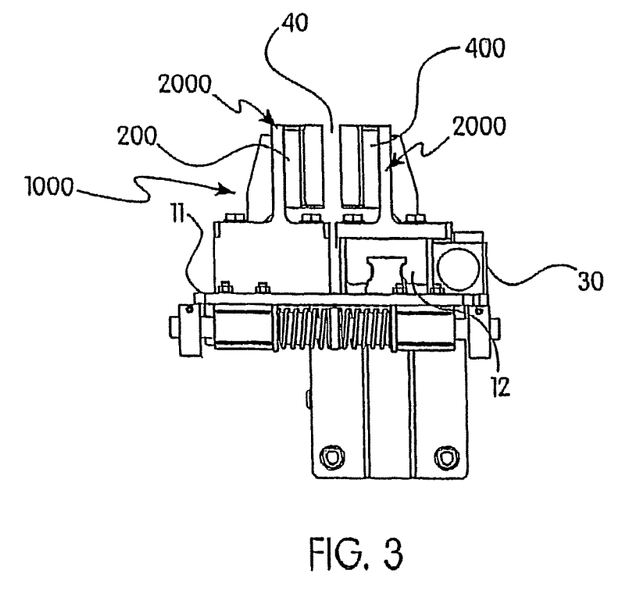
FIG. 3 is a view of an embodiment of the present invention viewing the system along line AB in FIG. 2.

The inventive system 100 is intended to operate in conjunction with a conventional type synchronous linear electrical machine operating as a motor or an electrodynamic brake. An example of such a synchronous linear electrical machine operating as a motor or an electrodynamic brake preferably comprises primary members 300, 500 comprising arrays of at least two permanent magnets 310-380, 510-580 of alternating polarity. The magnets are preferably attached to back plates 200, 400 which are preferably mounted on primary mounting plate 11. The magnets along with backplate and plates 10 comprise respective modules 1000, 2000. Preferably, a synchronous linear secondary stator member (not shown) accompanies the primary members to provide the synchronous linear electrical machine operating as a motor or an electrodynamic brake. A stator member can be mounted on the bottom of any incoming vehicle a fin-like protrusion that passes through the air gap 40 (shown in FIG. 3) between primary members 300, 500 of modules 1000, 2000. When the stator member and modules 1000, 2000 (and in turn the primary members 300, 500) move relative to one another, magneto-motive, i.e., braking force, force is created. Such is the operation of an eddy current brake. This invention, however, is concentrated on the primary members 300, 500 movement relative to one another and therefore discussion of a secondary stator member will be minimal.

Figure 5A:
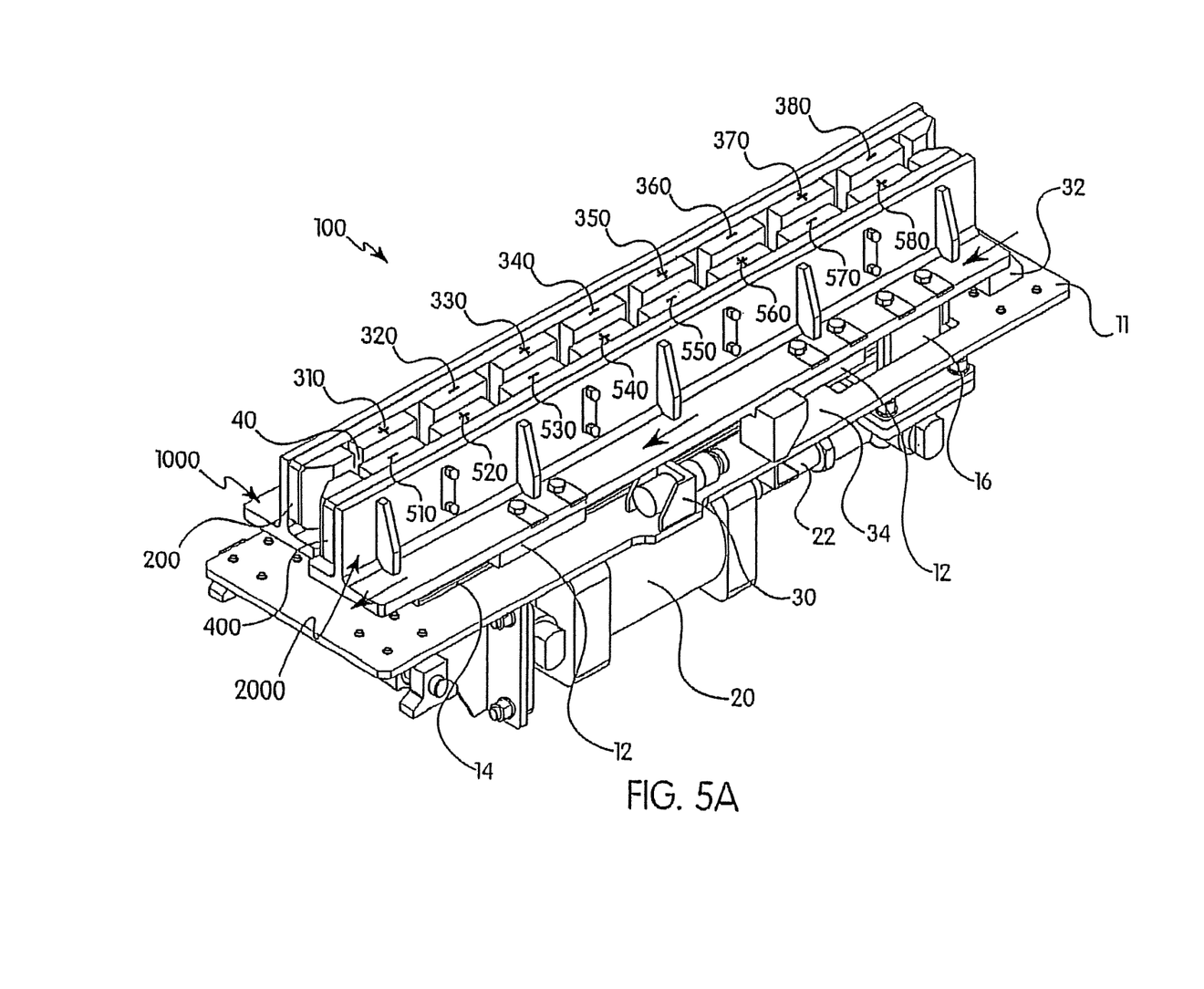
FIGS. 5A-5D show the displacement of a module having an array of magnets relative to the other module.
Figure 5B:
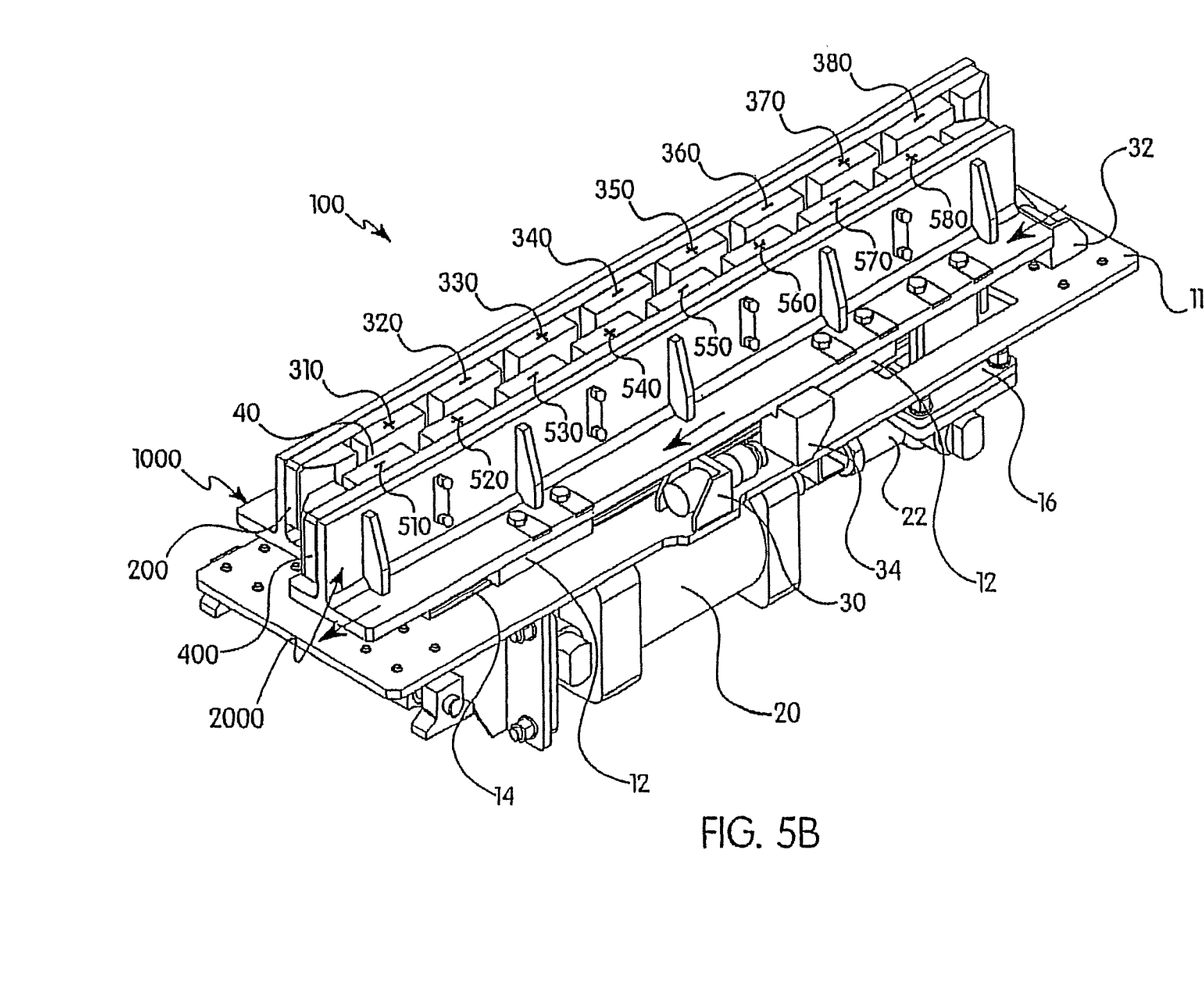
Figure 5C:
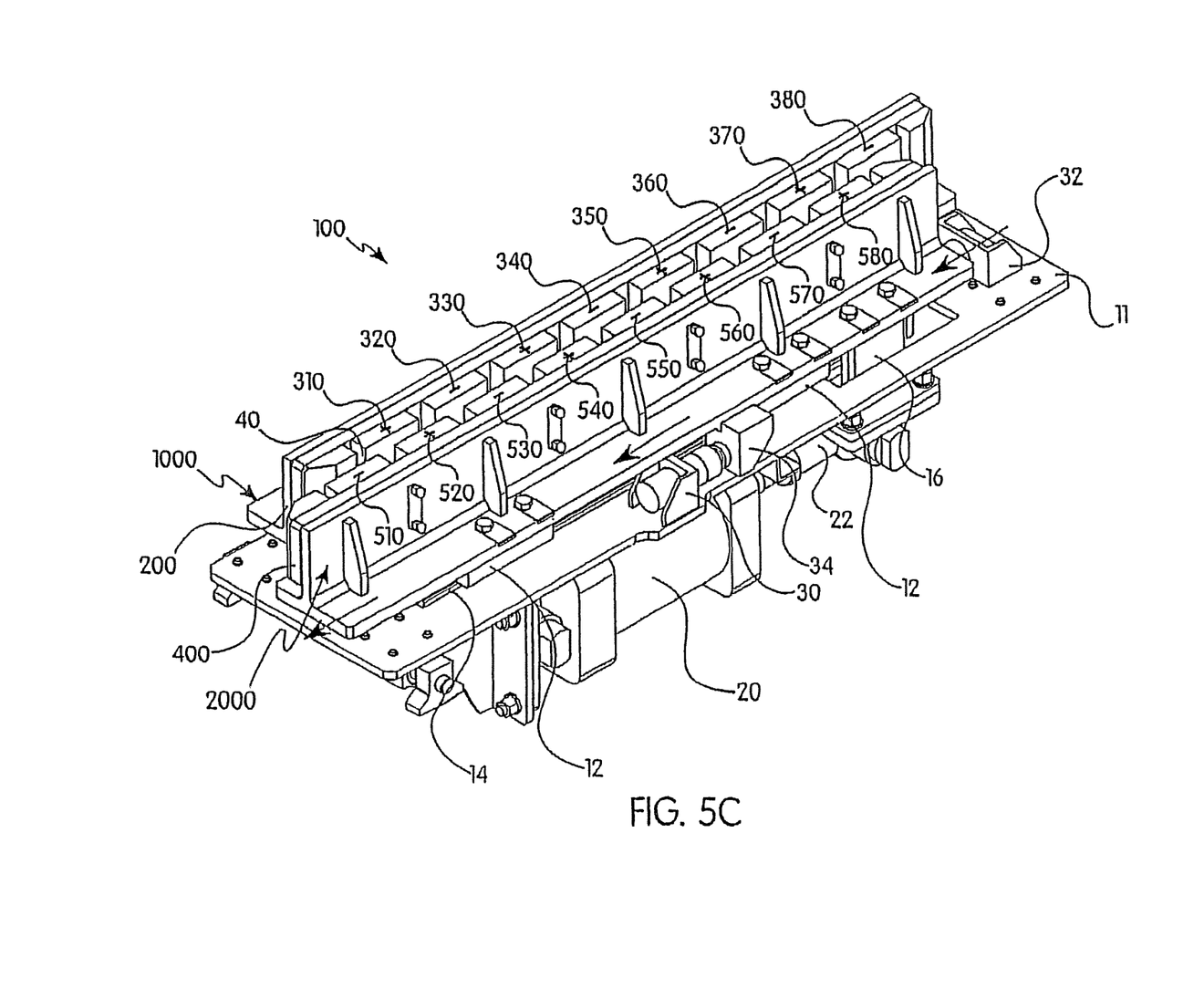
Figure 5D:
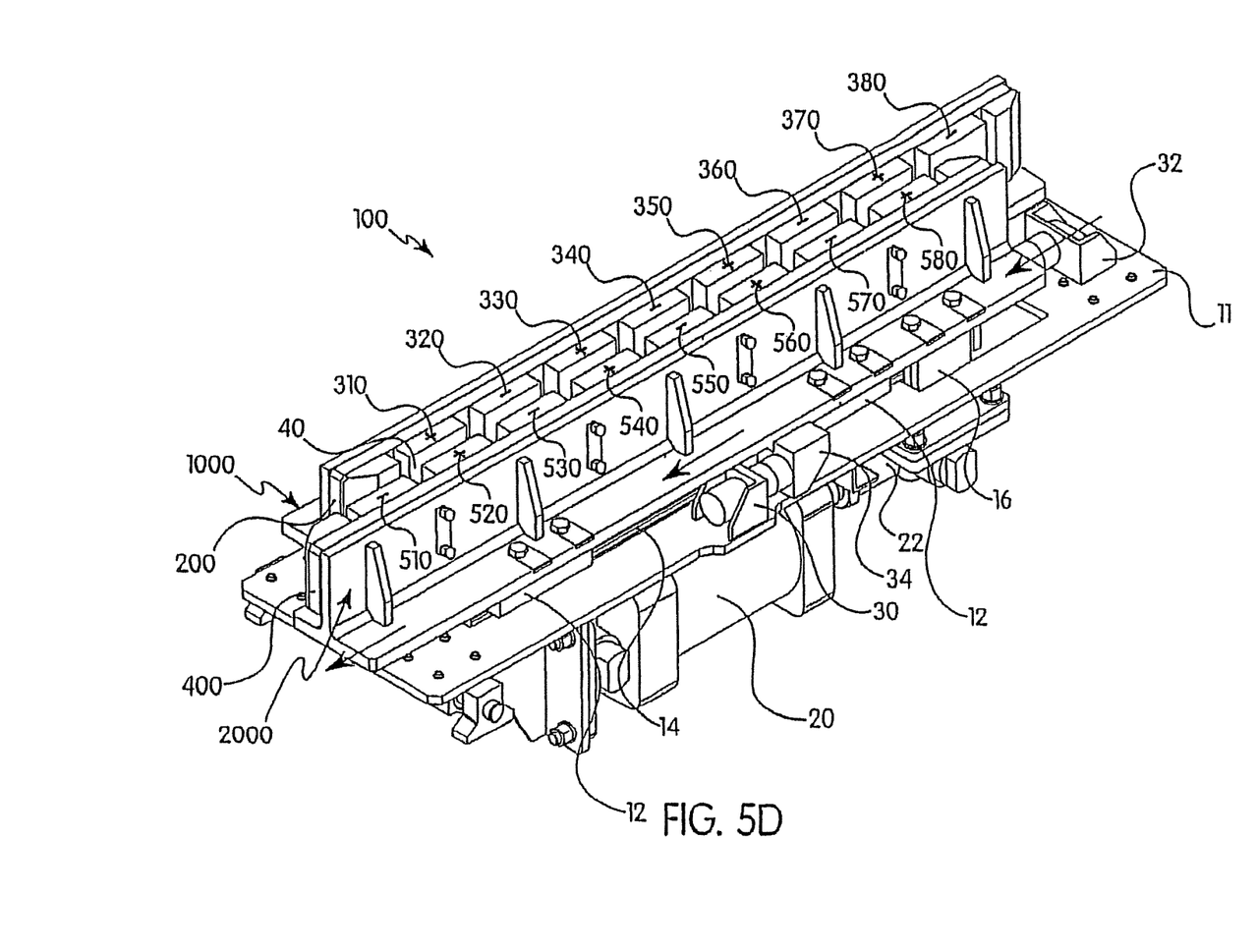

The two primary members 300, 500 oppose each other. It is known to those skilled in the art that if the magnets in opposing primary member arrays 300, 500 are moved 180 electrical degrees relative to one another (as shown in FIG. 5D), the electrodynamic brake is fully out of phase and thereby inactive. But if the magnets in the primary member arrays 300, 500 are incrementally moved relative to one another (as shown in FIGS. 5A-5C), the magneto-motive force created will correspond to the phase angle created by said relative movement. The present invention allows for the incremental movement of a primary member relative to an opposing primary member and in this way provides for a variable electrodynamic braking force.

Figure 1:
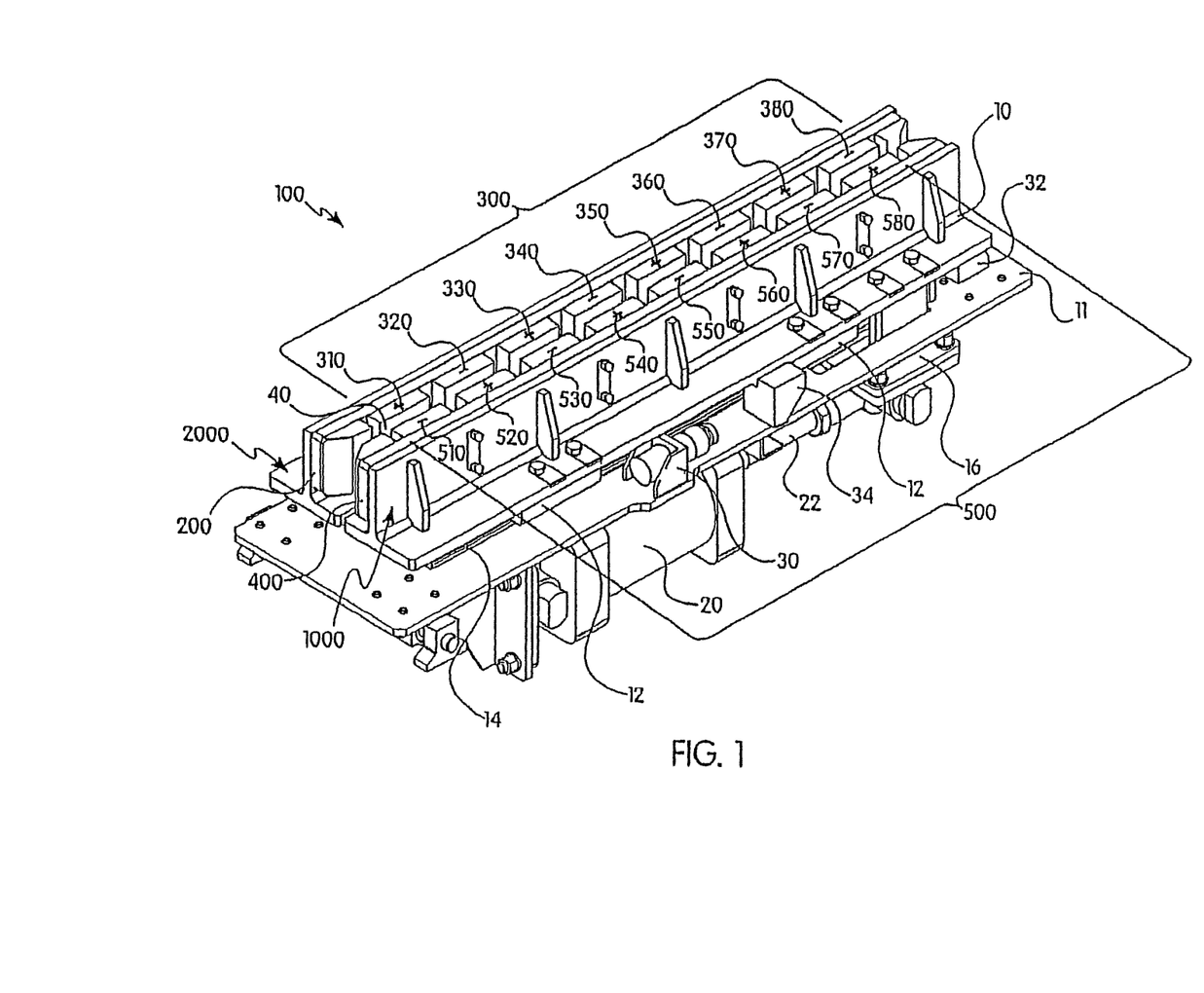
FIG. 1 is an isometric view of an embodiment of the present invention.
Figure 2:
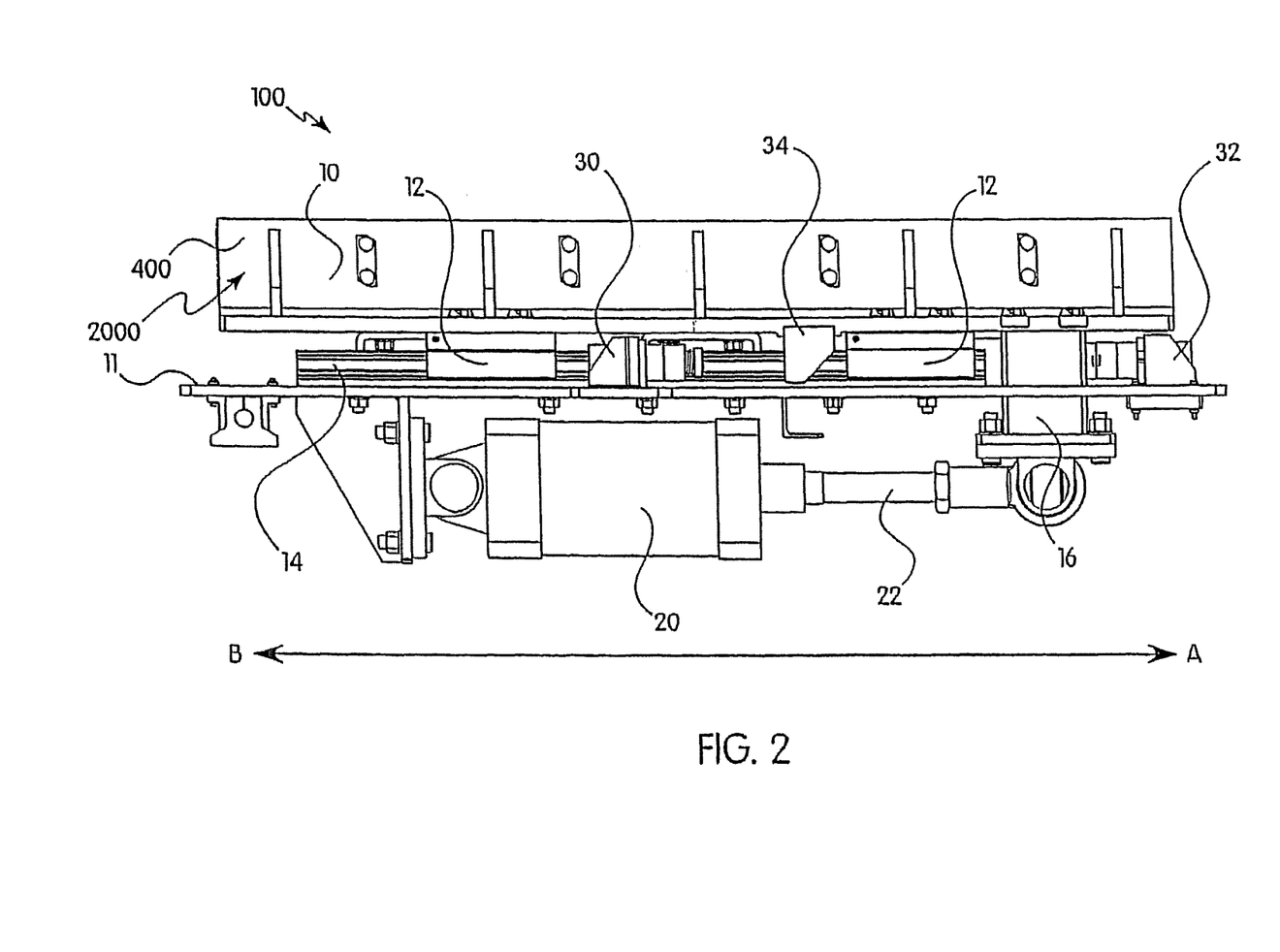
FIG. 2 is a side elevational view of an embodiment of the present invention.
Figure 4:
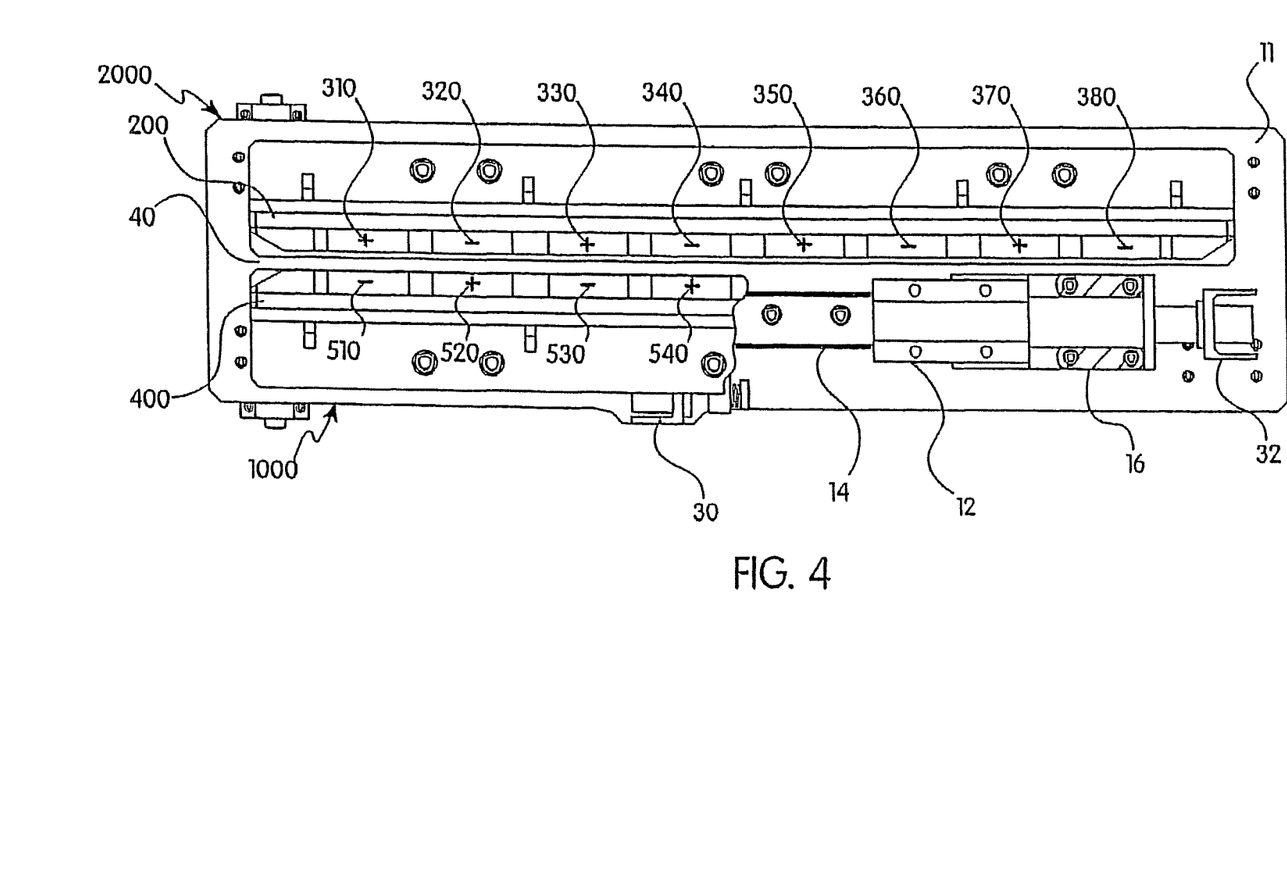
FIG. 4 is a top view of an embodiment of the present invention.

As shown in FIGS. 1, 4 and 5A-5D, in a preferred embodiment, the invention comprises two opposing primary members 300, 500 each comprising arrays of permanent magnets 310-380, 510-580. The first primary member 300 is preferably mounted in a stationary fashion. The second primary member 500 is mounted to a movable plate 10. The movable plate 10 is preferably an angle weldment. The arrays are preferably mounted to a back plate 200, 400 which is ferromagnetic. In the completely actuated position, the magnetic array of the primary member 300 in the first stationarily mounted member directly opposes the magnetic array of the second primary member 500 with magnets of opposite polarity facing each other, for example magnets 310, 320, 330, 340, 350, 360, 370, and 380 directly face and oppose magnets 510, 520, 530, 540, 550, 560, 570, and 580 respectively. The alignment of the magnets in the arrays of the primary members 300, 500 when the brake is in the completely actuated position is best shown in FIGS. 1 and 4, which show the positive magnet of the stationary array 310 directly opposing negative magnet 510 of the movable array. As best shown in FIG. 2, a carriage 12 is affixed to the movable plate 10 and is slidably engaged with a linear bearing slide 14. A bracket 16 connects the movable plate 10 to a push rod 22, said push rod 22 being driven by a means for incremental displacement 20. The means for incremental displacement 20 is preferably an optically encoded servo-motor operable to linearly displace the push rod 22 in direction A or B. The means for incremental displacement 20 is able to displace the push rod 22 (and therefore the movable plate 10) to and from a plurality of points along pathway AB. The end points of the pathway are only limited by the length of the push rod 22, the length of the linear slide bearing 14, or the placement of the cushion bump stops 30, 32. The incremental displacement in the invention differs from conventional systems, which only allow for displacement to and from only a few fixed points, most often two fixed points. Incremental displacement according to the present invention allows for modules and primary members to be moved to and from anywhere along a displacement path. Preferably, pressurized cushion bump stops 30 and 32 are affixed to the linear bearing slide 14 so as to limit the motion of the system upon contacting the bump stop supports 34.

In operation, the means for incremental displacement 20, by virtue of being drivingly attached to the movable plate 10, and thus the modules 1000, 2000, displaces the second primary member 500 a selected or a predetermined distance along direction AB. Braking force can be varied by the amount of displacement of the second primary member 500 relative to the first 300. The predetermined displacement distance is determined based on the amount of braking force that is desired to be applied to the moving object having the secondary stator member attached. The module 1000 can be moved relative to the stationary module 2000 a plurality of distances based on the desired braking force. To deactivate the brake completely, the secondary movable module 1000 will be moved completely out of phase as discussed above and as shown in FIG. 5D. It should be noted while that it is preferred to have one movable module and one stationary module, the invention also encompasses systems wherein both modules 1000, 2000, for example, are movable with respect to one another.

Figure 6:
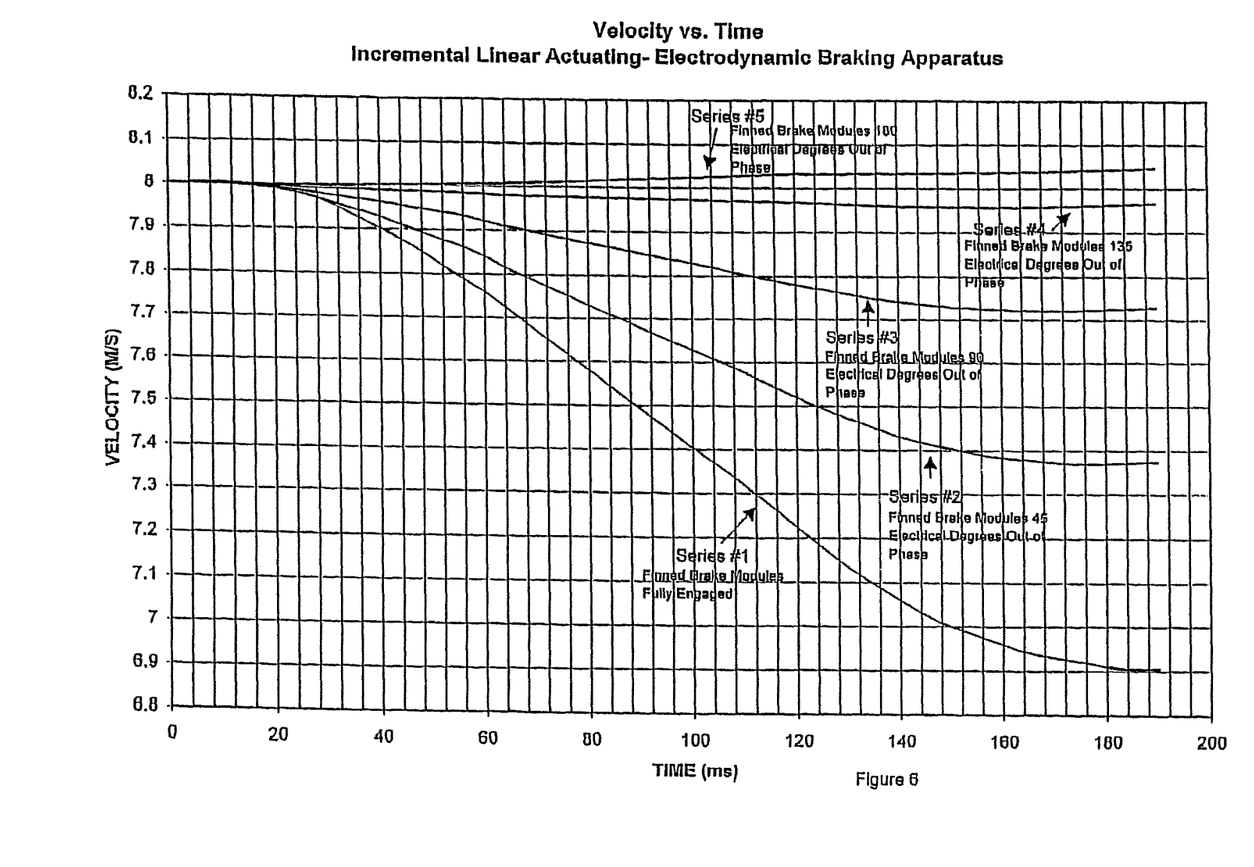
FIGS. 6 and 7 are graphs of finite-element-analysis models of the present invention.
Figure 7:
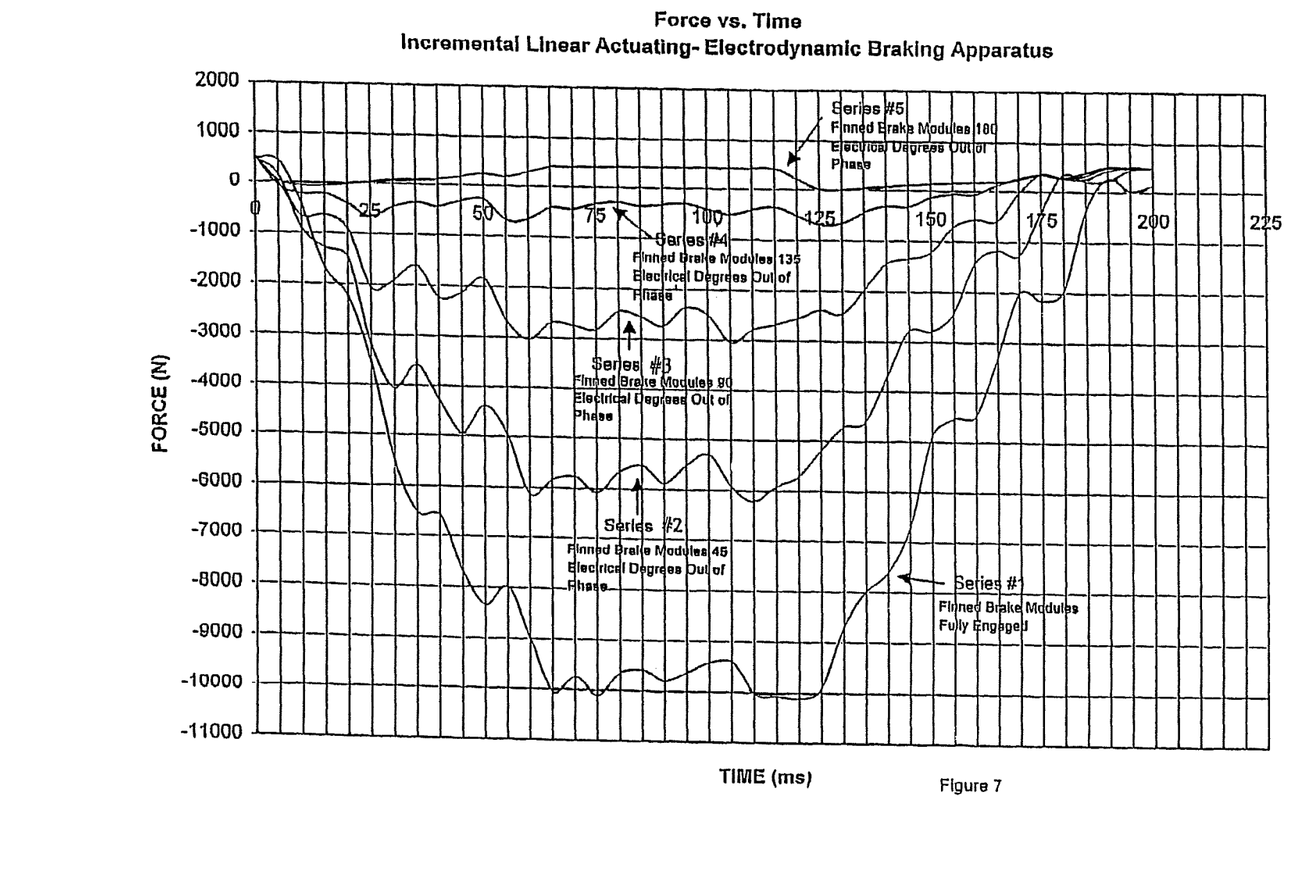

An example of the correlation between incremental displacement of the primary members and braking power is illustrated at FIGS. 6 and 7. FIG. 6 shows five finite-element-analysis models. FIG. 6 shows velocity versus time. FIG. 7 shows force verse versus time. In FIG. 6, series 1 shows as a function of velocity over time, a fully engaged operating set of finned modules without any actuation. Series 1 corresponds to the position of the modules shown in FIG. 1. It can be seen that rate of velocity reduction is greatest when the brake is fully engaged. Series 2 shows the brake's effectiveness in reducing velocity when the primary member is moved 45 electrical degrees out of phase according to the present invention. Series 2 corresponds to the position of the modules shown in FIG. 5A. It can be seen in Series 2 that rate of velocity reduction is lowered. Series 3 and 4 similarly show a decrease in the rate of reduction and corresponds to the position of the modules shown in FIGS. 5B and 5C respectively and caused by moving the member 90 and 135 electrical degrees out of phase. Finally, Series 5 shows a brake that is 180 degrees out of phase, which in this example was 5 linear inches of displacement of a primary member. Series 5 corresponds to the position of the modules shown in FIG. 5D. It can be seen that at this position, there is no reduction of velocity. FIG. 7 shows corresponding levels of braking force generated by the system.

Figure 8:
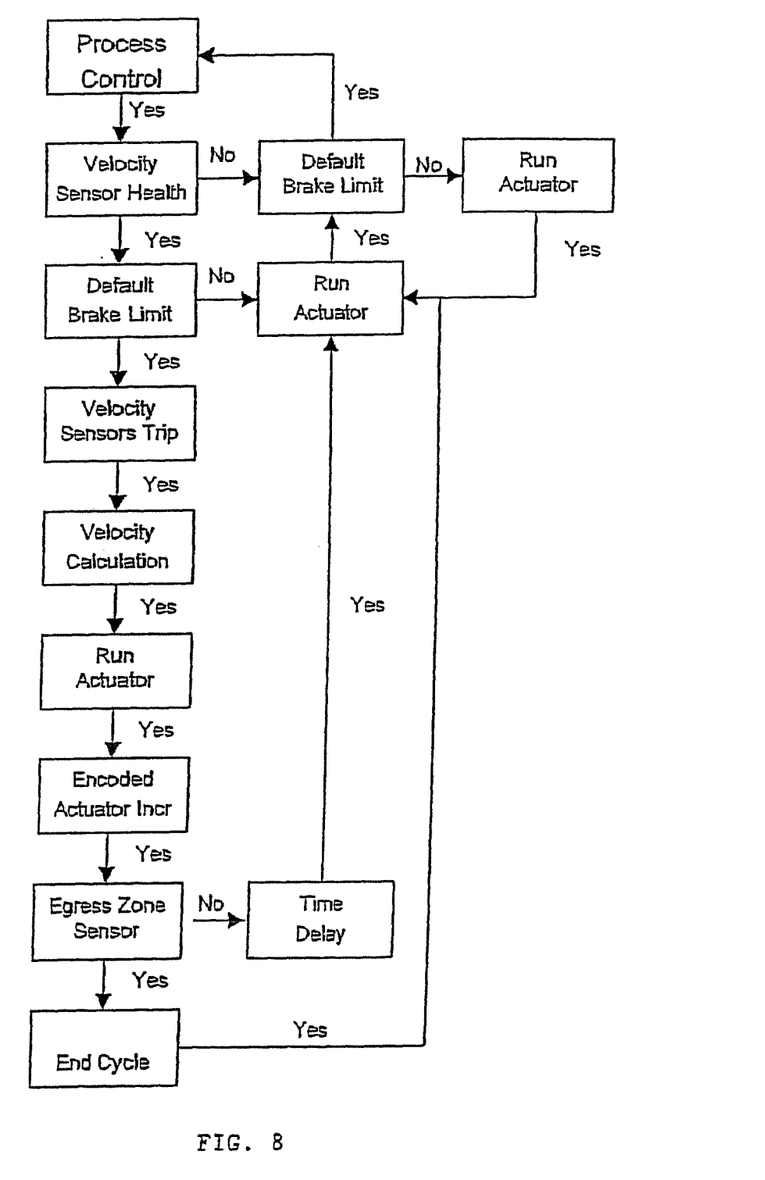
FIG. 8 is a schematic of the control system for an embodiment of the invention.

As schematically depicted in FIG. 8, another embodiment comprises, the means for incremental displacement 20 in communication with a detection device, which detects a condition, for example, the velocity of the incoming vehicle, temperature, humidity or mass of the incoming vehicle. In an example, the velocity detection device can be of the conventional kind, for example, a set of proximity switches or photosensors of the conventional type in a conventional arrangement that can determine velocity.

Figure 9:
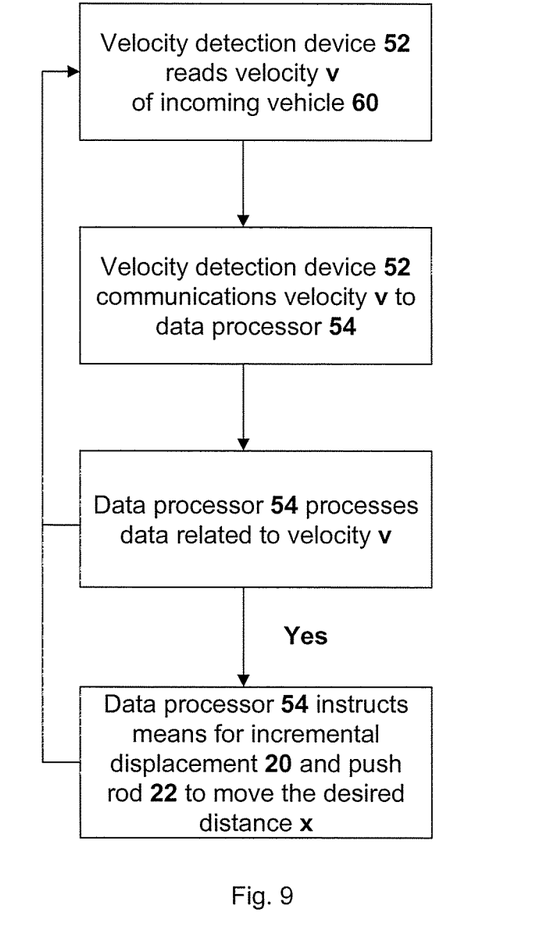
FIG. 9 is a flow diagram showing an embodiment of the invention.
Figure 10:
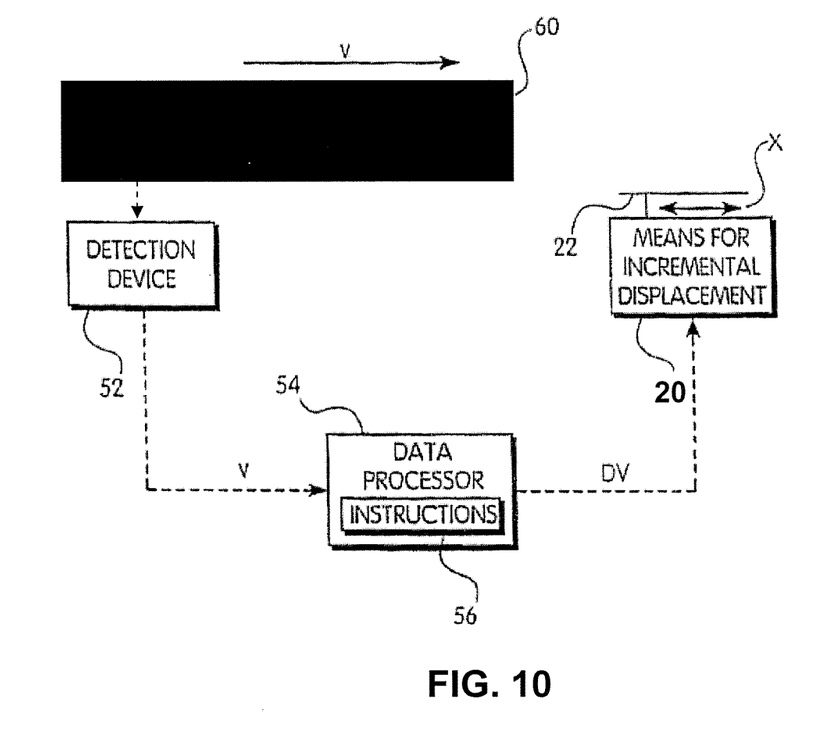
FIG. 10 is a schematic of an embodiment of the invention.

As shown in FIGS. 9 and 10, in the embodiment comprising a velocity detection device 52, the velocity detection device 52 reads the velocity V of an incoming vehicle 60 and communicates that velocity to a data processor 54. The data processor 54 comprises an encoded set of instructions 56 and processes the data to calculate the required displacement value DV of the movable module to achieve a desired braking force. The instructions 54 can be in the form of software or can be encoded on an embedded chip in the processor. The data processor 54 processes the data related to velocity, instructs the means for incremental displacement 20, and in turn the push rod 22, to move the desired distance X. In this way, the system provides a system and method that provides a braking level responsive to changes in velocity due to changes in mass, temperature, humidity, and other variables.

While the foregoing has been set forth in considerable detail, it is to be understood that the drawings and detailed embodiments are presented for elucidation and not limitation. Design variations, especially in matters of shape, size and arrangements of parts may be made but are within the principles of the invention. Those skilled in the art will realize that such changes or modifications of the invention or combinations of elements, variations, equivalents or improvements therein are still within the scope of the invention as defined in the appended claims.

We claim:

1. A selectively actuated eddy current braking system to apply a selected braking force to a magnetically reactive member, the system comprising:
   a) first and second modules located along substantially parallel first and second longitudinal axes and separated by a space sufficient to permit passage of the magnetically reactive member therethrough, at least the first module being essentially linearly displaceable relative to the second module along the longitudinal axes and each module comprising an array of permanent magnets arranged in alternating polarity, the array of permanent magnets of the first module all substantially in opposite polarity juxtaposition with the array of permanent magnets of the second module;
   b) a drive operably connected to at least the first module to effect said displacement of the first module along the longitudinal axes and relative to the second module thereby providing a selectable braking force on the magnetically reactive member having a minimum when the modules are moved substantially out of opposite polarity juxtaposition and the minimum braking force being substantially zero.

2. The selectively actuated eddy current braking system of claim 1, wherein said drive is an optically encoded servo-motor.

3. The selectively actuated eddy current braking system of claim 2 further comprising a push rod drivingly connected to the servo-motor and at least the first module.

4. The selectively actuated eddy current braking system of claim 1 further comprising a linear bearing slide slidably engaged with at least the first module and guiding at least the first module on a displacement path.

5. The selectively actuated eddy current braking system of claim 1 further comprising at least one stop limiting the displacement of the first module.

6. The selectively actuated eddy current braking system of claim 1 further comprising:
   a) means to detect a velocity of said magnetically reactive member;
   b) means to communicate said detected velocity;
   c) a coded instruction; and
   d) a processor to process said detected velocity communicated by the means for communicating along with said coded instruction to calculate a selected displacement distance value, said processor communicating said displacement distance value to said drive;
   wherein said drive displaces at least the first module according to the selected displacement distance value.

7. A selectively activated eddy current braking system to apply a selected braking force, the system comprising:
   a) a first module positioned along a first longitudinal axis and comprising an array of permanent magnets arranged in alternating polarity;
   b) a second module positioned along a second longitudinal axis substantially parallel to the first longitudinal axis, the second module comprising an array of permanent magnets arranged in alternating polarity, the array of permanent magnets of the first module all substantially in opposite polarity juxtaposition with the array of permanent magnets of the second module;
   c) a detection device to detect a velocity of the magnetically reactive member;
   d) a drive connected to at least the first module to effect a displacement of the first module relative to the second module essentially along the first longitudinal axis in response to the detected velocity for continuous movement about the opposite polarity juxtaposition.

8. The selectively actuated eddy current braking system of claim 7, wherein the second module is movable.

9. The selectively actuated eddy current braking system of claim 7, wherein said drive is an optically encoded servo-motor.

10. The selectively actuated eddy current braking system of claim 9 further comprising a push rod drivingly connected to the servo-motor and at least the first module.

11. The selectively actuated eddy current braking system of claim 7 further comprising a linear bearing slide slidably engaged with at least the first module and guiding at least the first module on a displacement path.

12. The selectively actuated eddy current braking system of claim 7 further comprising at least one stop limiting the displacement of the first module.

13. The selectively actuated eddy current braking system of claim 7 further comprising:
   a) means to communicate said velocity;
   b) a coded instruction; and
   c) a processor to process said velocity communicated by the means for communicating along with said coded instruction to calculate a selected displacement distance value, said processor communicating said displacement distance value to said drive;
   wherein the drive displaces at least the first module according to the selected displacement distance value.

14. A method of applying a selected braking force to a magnetically reactive member, said method comprising the steps of:
   a) passing said magnetically reactive member between first and second spaced apart modules, the modules being positioned along substantially parallel longitudinal axes, each module comprising an array of permanent magnets arranged in alternating polarity and the array of permanent magnets of the first module all substantially in opposite polarity juxtaposition from the array in the second module;
   b) displacing at least the first module essentially along the longitudinal axis in a displacement to alter the polarity juxtaposition relative to the second module thereby providing a selected braking force on the magnetically reactive member, the braking force having a minimum when the modules are moved substantially out of opposite polarity juxtaposition and the minimum braking force being substantially zero.

15. The method as in claim 14 further comprising the steps of:
   a) detecting a velocity of said magnetically reactive member; and
   b) calculating a selected displacement distance value based on said detected velocity, wherein said step of displacing displaces said module said selected displacement distance.

16. A selectively actuated eddy current braking system to apply a selected braking force, the system comprising:
   a first primary member with a first longitudinal axis comprising a first array of permanent magnets arranged in alternating polarity;
   a second primary member with a second longitudinal axis comprising a second array of permanent magnets arranged in alternating polarity, the first array of permanent magnets all in substantially opposite polarity juxtaposition from the second array of permanent magnets, wherein the first longitudinal axis is substantially parallel to the second longitudinal axis, wherein the first primary member is linearly displaceable relative to the second primary member essentially along the first longitudinal axis, and a drive system operably connected to the first primary member to effect said displacement of the first primary member along the first longitudinal axis relative to the second primary member for providing a selectable braking force having a minimum when the first primary member and the second primary member are moved substantially out of opposite polarity juxtaposition.

17. The system of claim 16, wherein the first longitudinal axis and the second longitudinal axis are separated by a space sufficient to permit passage of a magnetically reactive member therethrough.

18. The system of claim 17, wherein the selectable braking force is applied to the magnetically reactive member.

19. The system of claim 16, wherein the first array of permanent magnets is substantially in opposite polarity juxtaposition with the second array of permanent magnets.

20. The system of claim 16, wherein the displacement of the first primary member is incremental.

21. The system of claim 16, wherein the minimum braking force is substantially zero.

* * * * *